United States Patent
McDaniel et al.

(10) Patent No.: US 8,700,724 B2
(45) Date of Patent: Apr. 15, 2014

(54) SYSTEM AND METHOD FOR TRANSFERRING DATA OVER A REMOTE DIRECT MEMORY ACCESS (RDMA) NETWORK

(75) Inventors: Scott S. McDaniel, Villa Park, CA (US); Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2293 days.

(21) Appl. No.: 10/643,331

(22) Filed: Aug. 19, 2003

(65) Prior Publication Data
US 2004/0073622 A1 Apr. 15, 2004

Related U.S. Application Data

(60) Provisional application No. 60/404,709, filed on Aug. 19, 2002.

(51) Int. Cl.
*G06F 15/167* (2006.01)
(52) U.S. Cl.
USPC .......................................................... 709/212
(58) Field of Classification Search
USPC .......................................................... 709/212
See application file for complete search history.

(56) References Cited

U.S. PATENT DOCUMENTS

| | | | | |
|---|---|---|---|---|
| 5,790,804 A * | 8/1998 | Osborne | ........................ | 709/245 |
| 5,819,115 A | 10/1998 | Hoese et al. | | |
| 5,991,797 A * | 11/1999 | Futral et al. | .................... | 709/216 |
| 6,304,910 B1 * | 10/2001 | Roach et al. | ................... | 709/236 |
| 6,397,316 B2 * | 5/2002 | Fesas, Jr. | ........................ | 711/200 |
| 6,421,742 B1 * | 7/2002 | Tillier | ............................... | 710/1 |
| 6,545,981 B1 | 4/2003 | Garcia et al. | | |
| 6,658,469 B1 | 12/2003 | Massa et al. | | |
| 7,376,755 B2 * | 5/2008 | Pandya | ......................... | 709/250 |

OTHER PUBLICATIONS

EPO Communication dated Jun. 9, 2010 with search report.

* cited by examiner

*Primary Examiner* — Phuoc Nguyen
*Assistant Examiner* — Kishin G Belani
(74) *Attorney, Agent, or Firm* — Thomas|Horstemeyer, LLP

(57) ABSTRACT

Systems and methods that provide one-shot remote direct memory access (RDMA) are provided. In one embodiment, a system that transfers data over an RDMA network may include, for example, a host. The host may include, for example, a driver and a network interface card (NIC), the driver being coupled to the NIC. The driver and the NIC may perform a one-shot initiation process and/or a one-shot completion process of an RDMA operation.

25 Claims, 6 Drawing Sheets

SYSTEM AND METHOD FOR TRANSFERRING DATA OVER A REMOTE DIRECT MEMORY ACCESS (RDMA) NETWORK

RELATED APPLICATIONS

This application makes reference to, claims priority to and claims benefit from U.S. Provisional Patent Application Ser. No. 60/404,709, entitled "Optimizing RDMA for Storage Applications" and filed on Aug. 19, 2002.

INCORPORATION BY REFERENCE

The above-referenced United States patent application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Some network technologies (e.g., 1 Gb Ethernet, TCP, etc.) may provide the ability to move data between different memories in different systems. When network speeds began increasing beyond approximately 100 Mbps, network interface cards (NICs) were adapted to provide direct memory access (DMA) techniques to limit system overhead for locally accessing the data over the network. Virtual memory operating systems (e.g., Windows and Unix) provide for addressing memory in addition to the physical system memory. A unit of information can, for example, either be present in the physical memory (i.e., "pinned down") or may be swapped out to disk. A DMA device typically accesses only physical memory, and therefore, the operating system should guarantee that the unit of information to be moved over the network is "pinned down" in physical memory before the NIC can DMA the information. That is, a particular block of memory may be configured such that the block of memory cannot be moved or swapped to a disk storage.

FIG. 1 shows a block representation of a conventional system in which data is copied from a pinned buffer in a first host to a pinned buffer in a second host. The first host 10 includes a pinned buffer 20, a driver 30 and a NIC 40. The pinned buffer 20 and the driver 30 are each coupled to the NIC 40. The second host 50 includes a pinned buffer 60, a driver 70 and a NIC 80. The pinned buffer 60 and the driver 70 are each coupled to the NIC 80. The NIC 40 is coupled to the NIC 80 via a network 90. The driver in this example may take many forms, such as, for example, a stand-alone driver or a driver as part of a more comprehensive software package.

In operation, the driver 30 or other software in the host 10 writes a descriptor for a location of the pinned buffer 20 to the NIC 40. The driver 70 or other software in the host 50 writes a descriptor for a location of the pinned buffer 60 to the NIC 80. The driver 30, works with the operating system and other software and hardware in the system to guarantee that the buffers 20 are locked into physical host memory (i.e., "pinned"). The NIC 40 reads data from the pinned buffer 20 and sends the read data on the network 90. The network 90 passes the data to the NIC 80 of the host 50. The NIC 80 writes data to the pinned buffer 60.

Conventionally, different and incompatible upper layer protocol (ULP) applications may be used to perform a particular data transfer. For example, a storage application defined according to a storage protocol such as Internet Small Computer System Interface (iSCSI) may provide a particular data transfer using an iSCSI network. In another example, a database application defined according to a remote direct memory access protocol (RDMAP) may provide a particular data transfer using an RDMA network. However, iSCSI was developed and optimized for general storage such as in a storage networks. In contrast, RDMA was developed and optimized for different purposes such as, for example, interprocess communications (IPC) applications. Unfortunately, conventional systems have been unable to efficiently combine some of the advantageous features of iSCSI and RDMA into a single ULP application using a single network. For example, conventional iSCSI systems have proven to be inflexible when applied to non-storage applications and conventional RDMA systems have not been developed to efficiently provide data storage as already provided in conventional iSCSI systems.

FIG. 2 shows a flow diagram of a conventional storage network system using iSCSI. In operation, data is written from Host 1 to Host 2. This operation may be similar, but is not limited to, the functionality exhibited by disk Host Bus Adapter (HBA) devices. In path 100, a driver on Host 1 writes a command to a command queue (e.g., a ring) that requests that the contents of a set of pre-pinned buffers be written to a specific disk location in Host 2. In path 110, NIC 1 reads the command from the queue and processes it. NIC 1 builds a mapping table for the pinned buffers on Host 1. The mapping table is given a handle, for example, "Command X." In path 120, NIC 1 sends a write command to Host 2 that requests that data be pulled from "Command X" of Host 1 into a location on the disk in Host 2. The write command also requests that Host 2 inform Host 1 when the write command has been completed. In path 130, NIC 2 of Host 2 receives the write command and passes the write command to a driver for processing through a completion queue. In path 140, the driver of Host 2 reads the command and allocates buffers into which data may temporarily be stored. In path 150, the driver writes a command to the NIC command queue that "the allocated buffers be filled with data from the 'Command X' of Host 1." It is possible that paths 130-150 can be executed entirely by NIC 2 if the driver pre-posts a pool of buffers into which data may be written.

In path 160, NIC 2 processes the pull command. NIC 2 builds a mapping table for the pinned buffers on Host 2 and creates a handle, for example, "Command Y." A command is sent to NIC 1 requesting "fill Command Y of Host 2 with data from "Command X" of Host 1." The sent command can be broken up into a plurality of commands to throttle data transfer into Host 2. In path 170, as NIC 1 receives each command, NIC 1 uses its mapping table to read data from Host 1. In path 180, NIC 1 formats each piece of read data into packets and sends the packets to Host 2. In path 190, as NIC 2 receives each pull response, NIC 2 determines where to place the data of each pull response using its mapping table and writes the data to Host 2. In path 200, after all the data has been pulled, NIC 2 writes a completion command to the Host 2 driver that says that it has completed the pull command specified in path 150. In path 210, Host 2 reads the command response and processes the data in the buffers to disk (path 211).

In path 220, when the data has been processed and the buffers on Host 1 are no longer needed, Host 2 writes a status command to NIC 2. The command states that the command received in path 140 has been completed and that "Command X" of Host 1 can be released. In path 230, NIC 2 reads the status command. In path 240, the status command is sent to Host 1. In path 250, NIC 1 receives the status command that indicates that the buffers associated with "Command X" of Host 1 are no longer needed. NIC 1 frees the mapping table associated with "Command X" of Host 1. Once the internal resources have been recovered, the status is written to the completion queue on Host 1. In step path, the driver of Host 1 reads the completion and is informed that the command requested in path 100 is complete.

FIG. 3 shows a flow diagram of a conventional storage system implementation using a remote direct memory access protocol (RDMAP). In this exemplary operation, data is written from Host 1 to Host 2. In path 270, a driver requests the Operating System to pin memory and develop a table. The driver may also, in an additional path, request the NIC to register the memory. In path 280, NIC 1 responds with a region identification (RID) for the table in NIC 1. In path 290, the driver requests that a window be bound to a region. In one conventional example, the system may not employ a window concept and thus may not need to perform steps related to the window concept. In path 300, NIC 1 responds with the STag value that corresponds to the bound window/region pair. In path 310, the driver formats a write request packet and places the STag value somewhere within the packet as set forth by a particular storage protocol. In path 320, NIC 1 sends the write message to NIC 2, advertising the buffer available on Host 1.

In path 330, NIC 2 receives the send message and posts the message to the driver. A driver on Host 2 then processes the send message and determines that data must be pulled to satisfy the command represented inside the send message. The driver, on path 340, queues an RDMA read command to NIC 2 to pull data from the STag on NIC 1 into the pinned memory on NIC 2. The Host 2 memory is pre-pinned. In path 350, NIC 2 processes the RDMA read command and sends a RDMA read request message to NIC 1. In path 360, NIC 1 receives and processes the RDMA read request message. NIC 1 responds by reading the data from the pinned memory on Host 1 as set forth by the internal pinned memory table. In path 370, RDMA read response data is transmitted to NIC 2. In path 380, NIC 2 writes data to the pinned memory of Host 2 for each RDMA read response it gets. Host 1 receives no indication of the progress of the writing of data into the Host 2 pinned memory. The operations indicated by paths 350-370 may be repeated as many times as Host 2/NIC 2 deem necessary. In path 390, on the last RDMA read response, NIC 2 indicates the RDMA read completion to the driver on Host 2.

In path 400, the driver on Host 2 formats and posts a send command that indicates that the command request sent on path 320 have been completed and that the STag value is no longer needed. In path 410, NIC 2 sends the message to NIC 1. In path 420, NIC 1 receives the send message and indicates the send message to the driver on Host 1. NIC 1 is not aware that STag information was passed within the send message. NIC 1 is not adapted to correlate the send message sent on path 410 with the write message sent on path 320. In path 430, the driver or the ULP on Host 1 knows the command is complete and releases the resources in NIC 1. Host 1 issues an unbind command to release the STag value. In path 440, NIC 1 responds that the STag is now free. In path 450, the driver on Host 1, informed that it is done with the region, requests that the resources be freed. In path 460, NIC 1 responds that the last resource has been freed.

Combining the functionality of RDMA technologies with iSCSI technologies into a single technology has proven difficult due to a number of incompatibilities. The iSCSI technologies are inflexible when used for other purposes, because iSCSI technologies are optimized for storage. For example, iSCSI technologies must pin memory for each data transfer. In contrast, RDMA technologies provide that a plurality of data transfers may reuse the pinned memory. The RDMA technologies suffer from a host/NIC interface that does not seemlessly approach the host/NIC interface of iSCSI technologies. For example, the initiation process according to RDMA requires a plurality of passes (e.g., paths 270-310), while the initiation process according to iSCSI is accomplished in a single pass (e.g., paths 100-110). Furthermore, RDMA suffers from a substantial delay during the initiation process (e.g., paths 270-310) and the completion processes (e.g., paths 420-260).

RDMA technologies (e.g., Infiniband) may differ from iSCSI technologies in other ways. Additional steps may be needed to advertise buffers through a dereferenced STag window. Building a pinned memory table (e.g., STag creation) may be isolated from the line traffic processes (e.g., send processes). When a send message is posted, the NIC may not be aware of the STag value that is passing within the send message.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may be found in, for example, systems and methods that provide one-shot remote direct memory access (RDMA). In one embodiment, the present invention may provide a system that transfers data over an RDMA network. The system may include, for example, a host. The host may include, for example, a driver and a network interface card (NIC). The driver may be coupled to the NIC. The driver and the NIC may perform a one-shot initiation process of an RDMA operation.

In another embodiment, the present invention may provide a system that transfers data over an RDMA network. The system may include, for example, a host. The host may include, for example, a driver and a network interface card (NIC). The driver may be coupled to the NIC. The driver and the NIC may perform a one-shot completion process of an RDMA operation.

In another embodiment, the present invention may provide a method that transfers data over an RDMA network. The method may include, for example, one or more of the following: initiating an RDMA write operation using a one-shot initiation process between a driver and a NIC; inserting a steering tag (STag) value in a first field of a direct data placement (DDP)/RDMA header of an RDMA send message; and validating the STag value in the first field by setting one or more bits (i.e., a "bit flag") in a second field of the DDP/RDMA header or by encoding a particular value in a second field of the DDP/RDMA header.

In yet another embodiment, the present invention may provide a method that transfers data over an RDMA network. The method may include, for example, one or more of the following: completing an RDMA write operation using a one-shot completion process between a NIC and a driver of a host; receiving a completion message; identifying a STag value in a first field of a header of the completion message; and validating the STag value in the first field of the header by identifying one or more set bits (i.e., a "bit flag") in a second field of the header or by identifying a particular encoded value in a second field of the header.

These and other features and advantages of the present invention may be appreciated from a review of the following detailed description of the present invention, along with the accompanying figures in which like reference numerals refer to like parts throughout.

DETAILED DESCRIPTION OF THE INVENTION

Some aspects of the present invention may be found, for example, in a remote direct memory access protocol (RD-MAP) that may provide the foundation upon which upper layer protocol (ULP) applications can use a single protocol (e.g., RDMAP) for data transfers over a single network (e.g., an RDMA network). Thus, for example, a data storage application and a database application may use the same network interface card (NIC) and the same network. Accordingly, a data storage application may seemlessly and efficiently transfer data over an RDMA network via an RDMA adapter having the look and feel of a data storage adapter (e.g., an Internet Small Computer System Interface (iSCSI) adapter).

In some embodiments, the present invention may provide systems and methods that provide accelerated pinning operations over an RDMA network. Accelerated pinning operations over an RDMA network protocol may provide, for example, substantial storage performance improvement over conventional RDMAP networks that were otherwise previously handicapped. Two novel RDMAP options may be added, for example, to a typical unsolicited send message. The two novel options may include, for example, a send with close-and-free specified steering tag (STag) for completion operations and a send with an advertise STag operation for request operations. These command modes may provide for data information or other information within the storage protocols being known by a network interface card (NIC) at the appropriate times for the advertise case or the completion case. Accordingly, in some embodiments, a simpler command semantic with the driver may be achieved. Either feature may be implemented independently to gain the benefits at the start of the complete command or at the end of the complete command.

In some embodiments, various aspects of the present invention may provide technologies that efficiently communicate the state of pinned buffers between a driver and a NIC with much less driver intervention, thereby substantially speeding up transfers.

In some embodiments, the present invention may provide for adding an optional field to communicate an associated STag value to a direct data placement (DDP) header or an RDMA send header (also referred to herein collectively as a (DDP)/RDMA header). Some embodiments may find application with, for example, an RDMAP that may support, for example, anonymous send commands by adding an optional STag field and indications as to whether the send command is of the close-this-STag or advertise-this-STag type.

Figure 1:
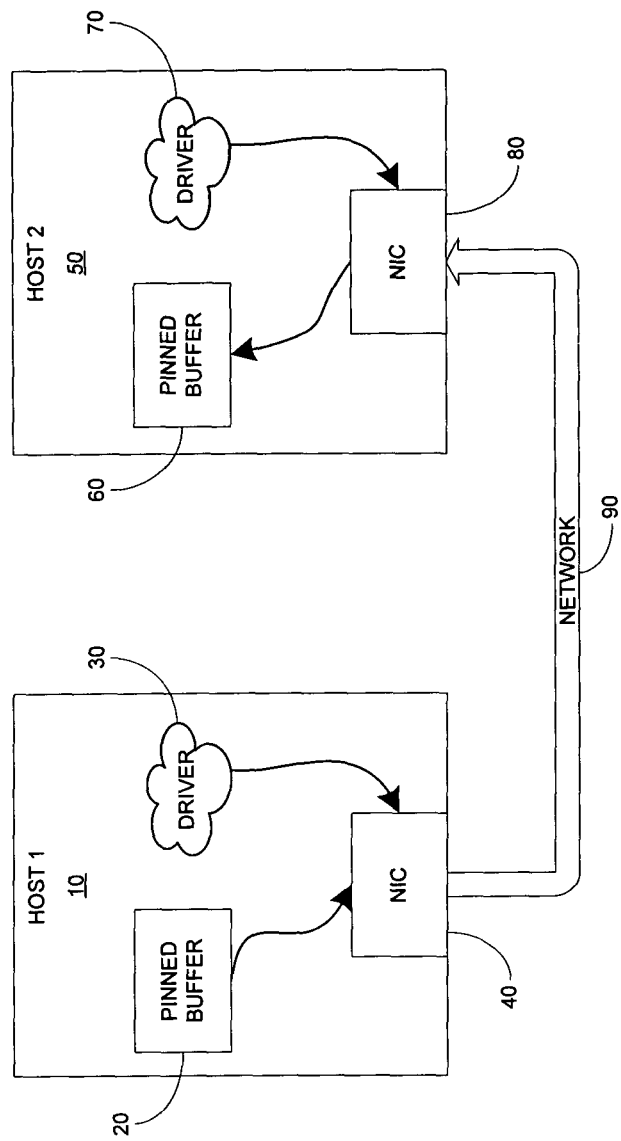
FIG. 1 shows a block representation of a conventional system in which data is copied from a pinned buffer in a first host to a pinned buffer in a second host.
Figure 2:
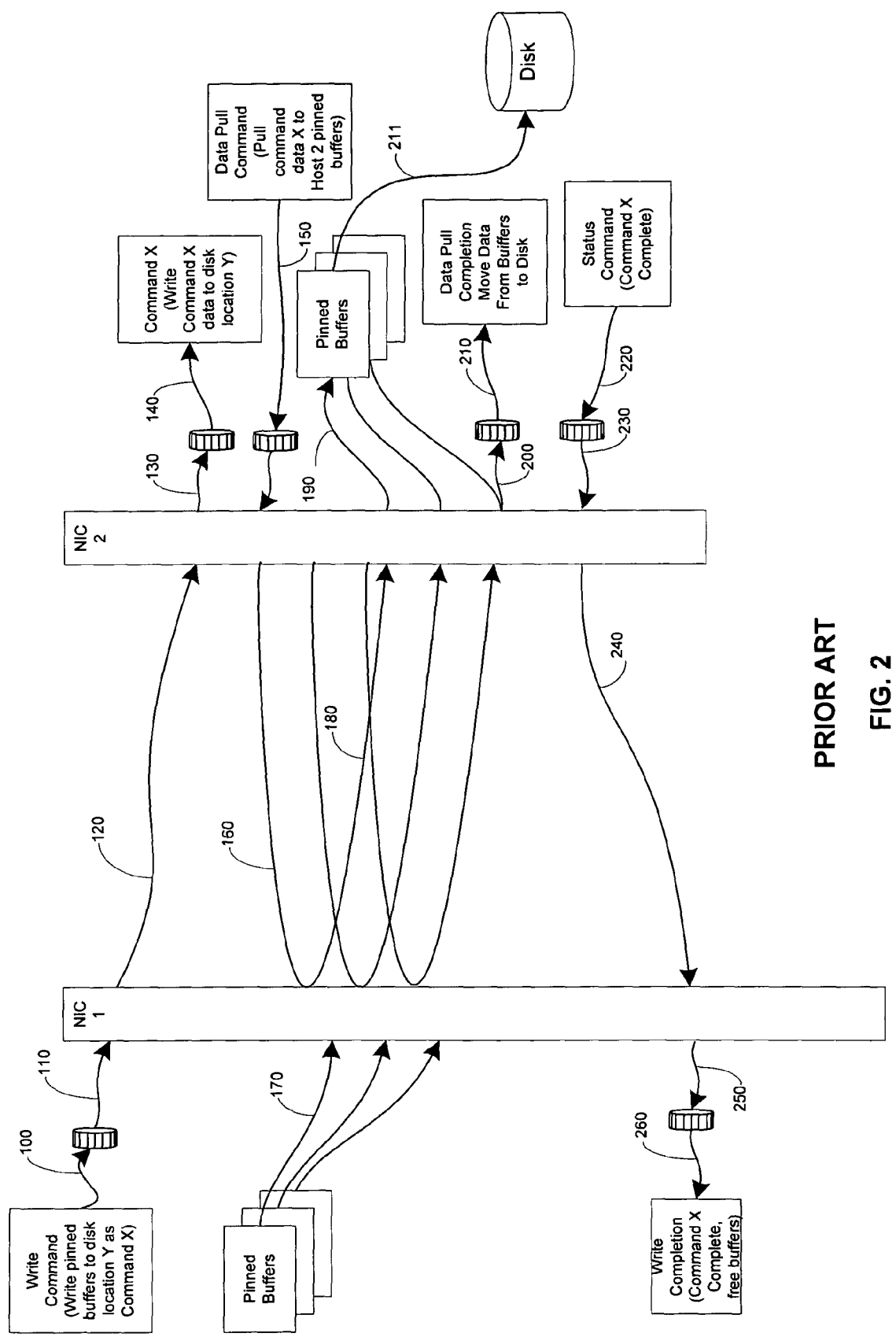
FIG. 2 shows a flow diagram of a conventional storage network system, for example, for use with Internet Small Computer System Interface (iSCSI).
Figure 3:
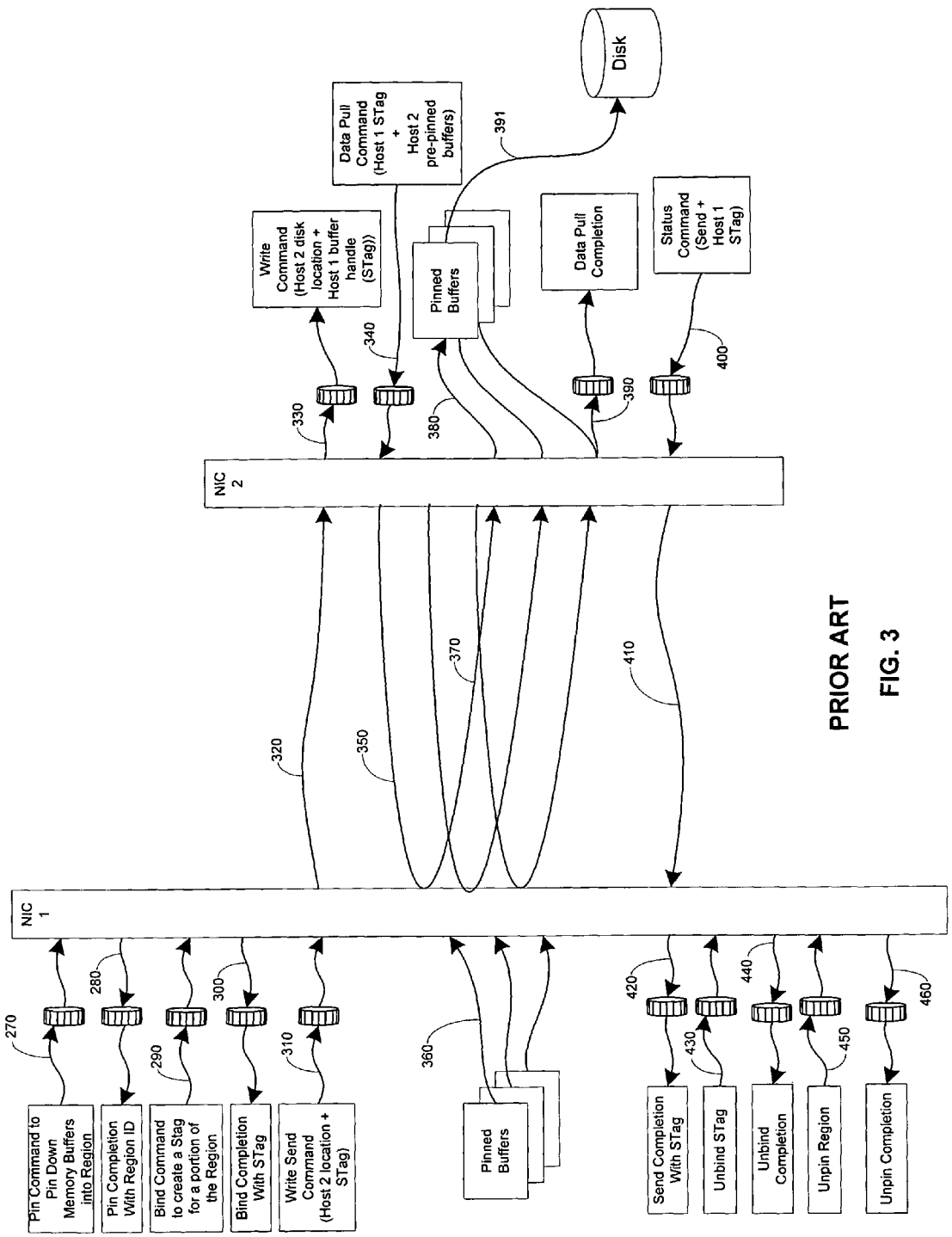
FIG. 3 shows a flow diagram of a conventional storage system over a remote direct memory access (RDMA) network.
Figure 4:
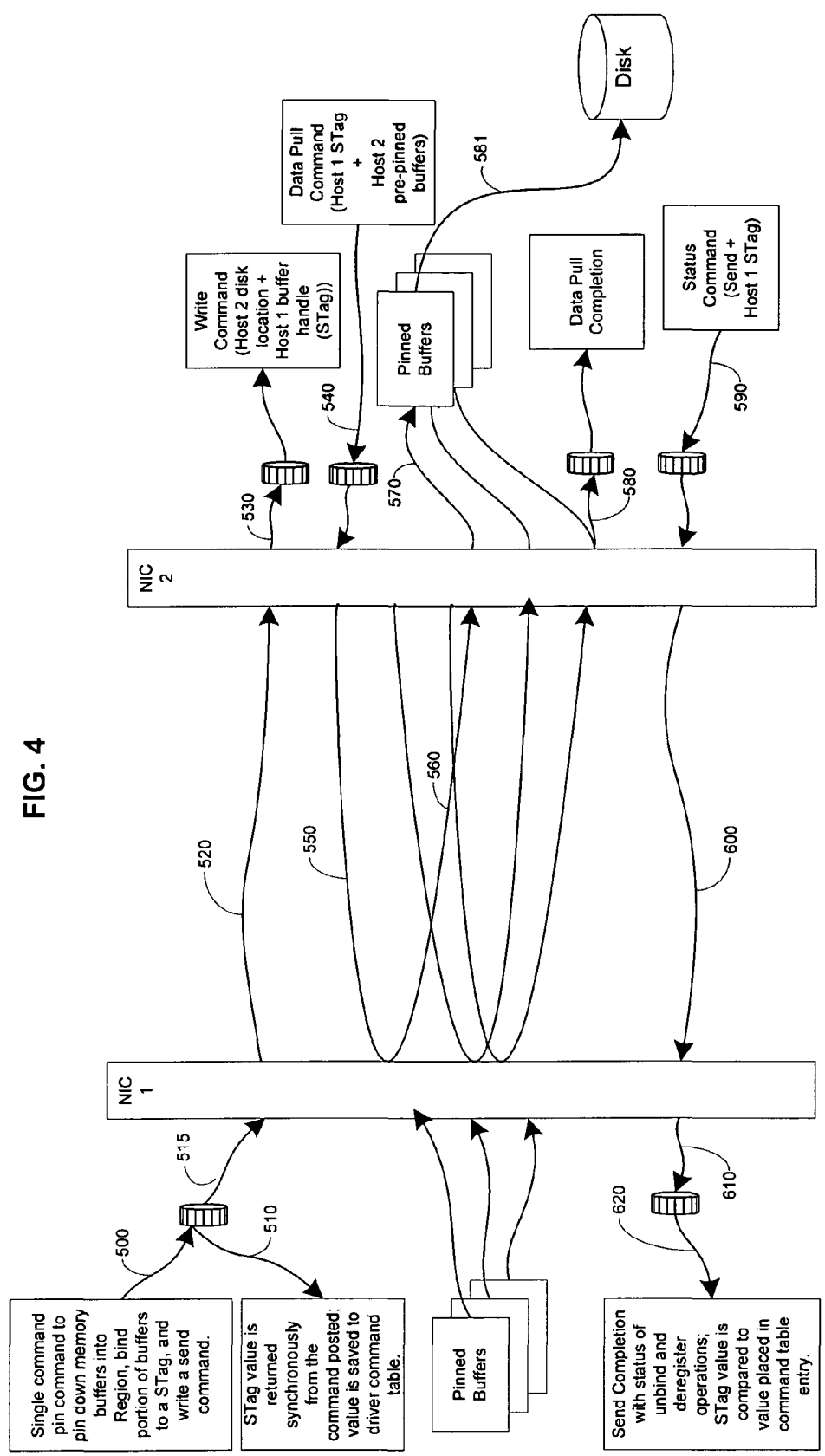
FIG. 4 shows a flow diagram of an embodiment of an optimize storage write over an RDMA network according to various aspects of the present invention.

FIG. 4 shows a flow diagram of an embodiment of an optimized storage write over an RDMA network according to various aspects of the present invention. A one-shot initiation process may be provided. In path 500, a driver on Host 1 may post a command (e.g., a single command) that provides scatter/gather (SGL) information, or some other description of a memory section in Host 1, for the command in a pre-formatted send body. In one embodiment, a single-command, may command that some pinned down memory buffers be incorporated into a region, that a portion of the pinned buffers be bound to an STag value, and that a send command be transmitted to the Host 2. In path 510, before the command is placed into the command ring going to NIC 1, the driver may allocate an STag value. The STag value may be returned synchronously from the command call and saved in a per-command table. The per-command table may, for example, include a driver command table holding a reference number (e.g., an iSCSI command sequence number maintained by the driver of Host 1) provided by the driver (or application) to that command along with the STag assigned to it. The STag value may be used later to verify that Host 1 and Host 2 have closed the correct STag value.

In path 515, NIC 1 may process the send message. NIC 1 may process the SGL data (or other memory resource data) as needed to make sure that it is available when RDMA read or RDMA write commands are received. NIC 1 also may associate the STag value that is used to reference the SGL in the RDMA commands with the pinned memory. The driver or NIC 1 may also add the reference number into one of the fields of the send message. This allows Host 2 to correlate the STag with some command accounted for by the application (e.g., a storage application running on Host 2). From this point on, and for the purpose of the RDMA transactions, the STag value may replace the Command number for handling the complete command on NIC 1. NIC 1 also may prepend the layer 2 (L2), layer 3 (L3), layer 4 (L4) and direct data placement (DDP)/RDMA headers to the pre-formatted send command. The STag value may, for example, be placed in an optional field within a DDP or RDMA header with some bit(s) (i.e., a bit flag) or a field within the header indicating that the STag field is valid. Finally, on path 520, NIC 1 may transmit the send message. Without the location and bit(s) defined by the RDMAP, NIC 1 may have to understand more about the storage application(s) (or other applications, if this is done on behalf of another type of application) running on the hosts to correctly define a command name and place the command within the send message.

In path 530, NIC 2 may receive the send message and may post the send message as a normal send message to a driver on Host 2. In addition to the send message body, the STag value may be indicated. In path 540, the driver on Host 2 may post an RDMA read command to pull data to Host 2. The data pull command may specify, for example, that data from the STag on Host 1 may be pulled into, for example, pre-pinned buffers on Host 2. The command may use, for example, the STag value received in path 530. In path 550, NIC 2 may send the RDMA read request command to NIC 1. The RDMA read request command may specify that STag data may be sent back in a read response. In path 560, NIC 1 may respond to the read request with a read response that includes, for example, data from the pinned buffers in Host 1 as referenced by the STag value. Each response segment may address the location in the pinned buffers of Host 2 in which the data may be written, for example, via NIC 2.

In path 570, NIC 2 may receive the read responses and may write the data as specified in each read response to a respective location in the pre-pinned buffers of Host 2. In path 580, on the last read response, NIC 2 may complete the RDMA read command on Host 2. In path 590, the driver on Host 2 may process the data from the pinned buffers of Host 2 by, for instance, moving the data from the pinned buffers to the disk as in path 581. When the pinned buffers on Host 1 are no longer needed, the driver may post a send command that includes a typical protocol message, the STag value of Host 1 and a set close-and-free bit in the send message. The STag value may be carried in an optional field and some bit(s) or field may be set to indicate that the STag field is valid. The driver may also include the application reference number used in path 510, to improve the robustness of matching to the STag, which may be performed later on Host 1 prior to resource releasing. In path 600, NIC 2 may send the send command as specified.

Various aspects of the present invention may provide a one-shot completion. In path 610, NIC 1 may receive the send-with-close message. Before delivering the send-with-close message to the driver on Host 1, NIC 1 may de-associate the STag with the SGL (or other reference to a memory section(s)) provided by the Driver on Host 1 and may free any resources dedicated to the SGL. NIC 1 then may complete to the driver on Host 1 indicating the send data and that the status of freeing the SGL and the STag is complete. The completion may also include, for example, the STag value. In path 620, the driver on Host 1 may be aware that all the resources in NIC 1 may be free. The driver may check that Host 2 associated the correct STag value with the command by verifying the returned STag value with the one saves as set forth in path 510. If they do not match, then a fatal violation of the protocol may have occurred, and, for example, Host 2 may be exhibiting buggy or erratic behavior.

Some embodiments of the present invention contemplate that storage reads may be similarly optimized. In this case, the RDMA write operations may replace the RDMA read operations in paths 550 and 560.

Figure 5A:
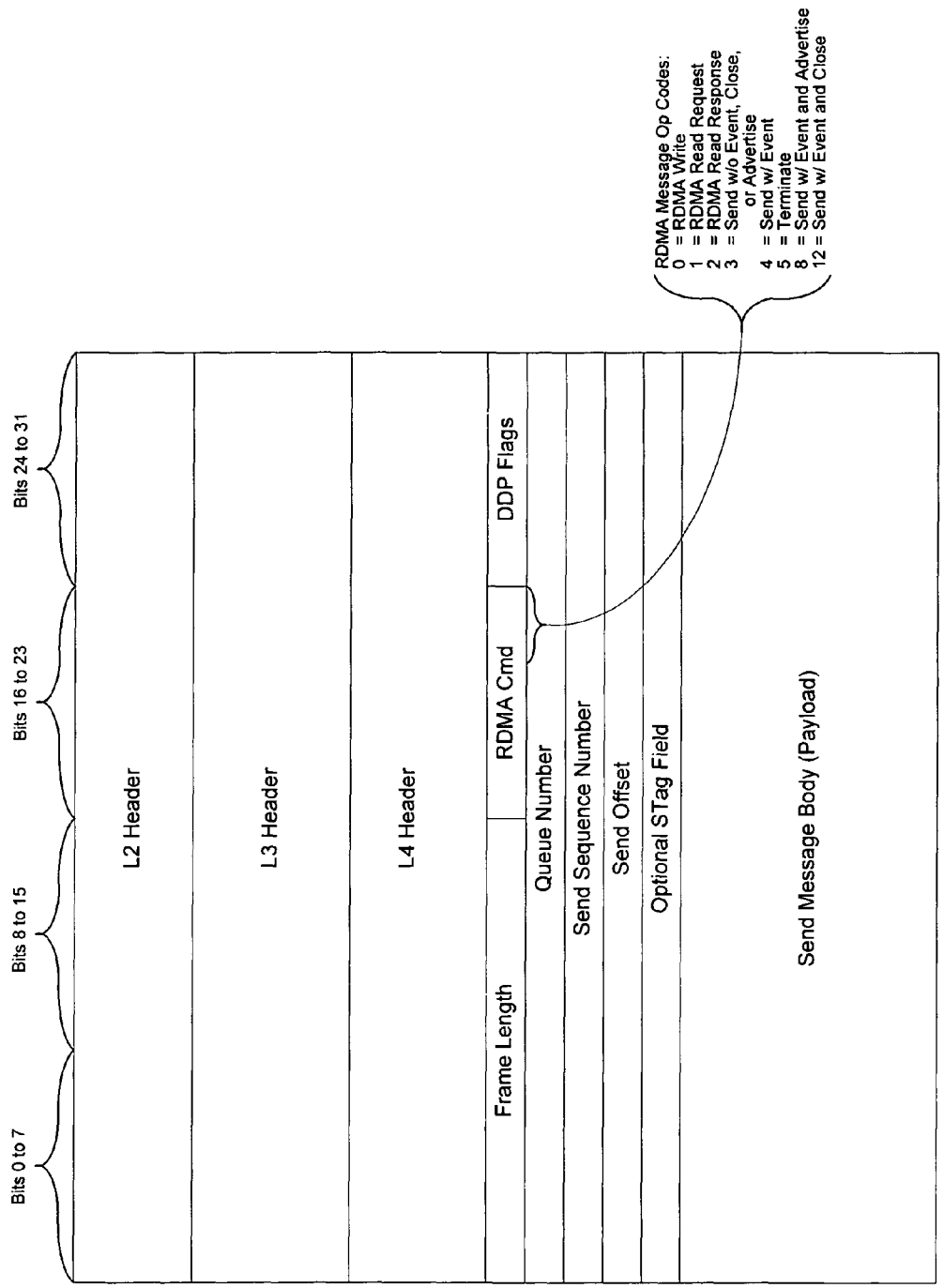
FIGS. 5A-B show embodiments that encode optional Steering Tag (STag) information according to various aspects of the present invention.
Figure 5B:
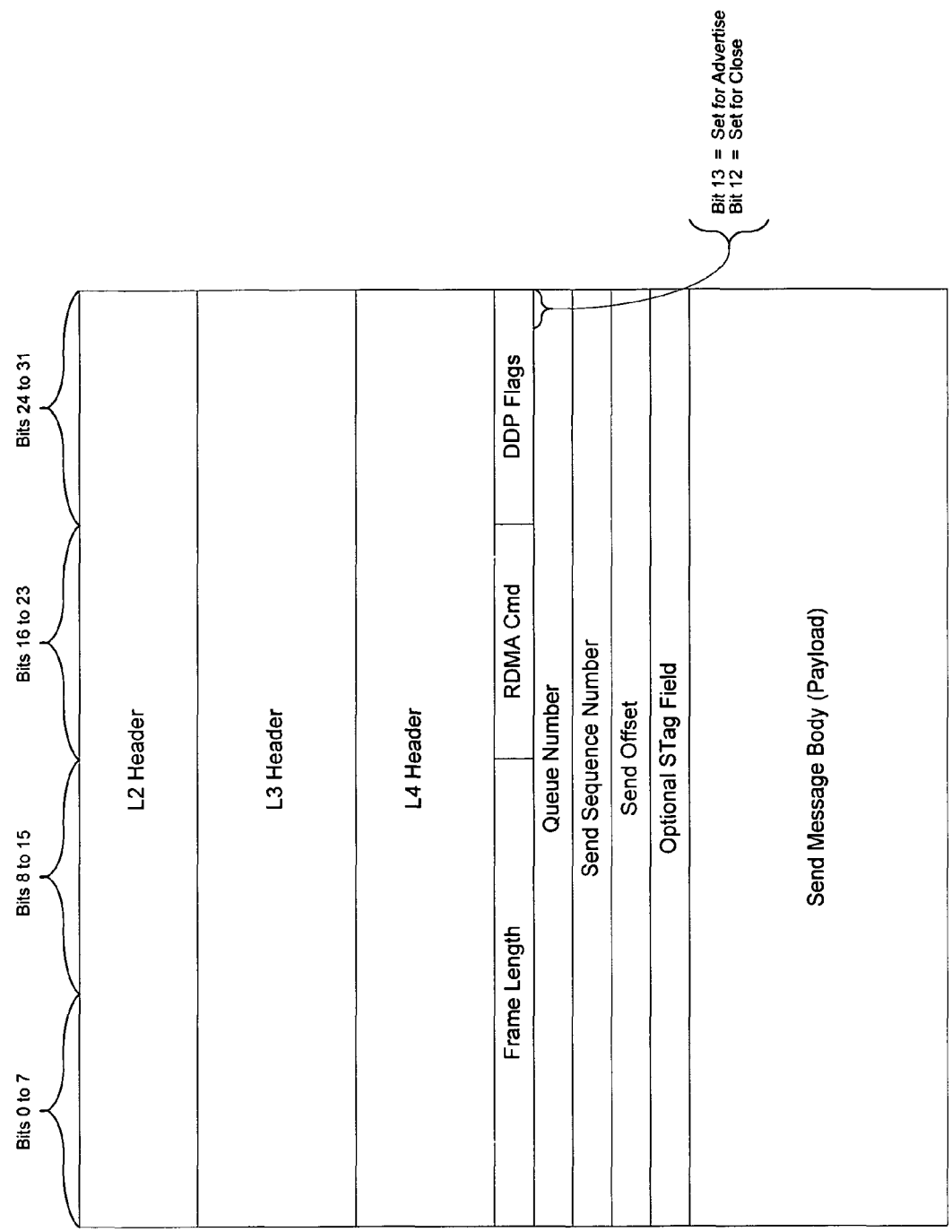

FIGS. 5A-B show two embodiments of encoding for optional STag information according to various aspects of the present invention.

FIG. 5A illustrates an embodiment of a send format for use in STag communications using RDMA on top of DDP according to various aspects of the present invention. In FIG. 5A, an RDMA message may include, for example, an optional STag field and operation codes (e.g., operational codes 0x8 and 0xC). The operational codes may include, for example, a set of two or more bits from a command word in a protocol. If particular values are specified (e.g., values indicating operation codes 0x8 or 0xC), then the optional STag field may be valid and the STag field may include, for example, a STag value that represents the SGL passed in the first command request from the driver.

The STag field may be present in all RDMA headers or may be present in only those RDMA headers in which the validating operation codes are set. In one embodiment, the protocol may define whether the STag field is present in each RDMA header or not.

The encoding of the operational codes may be such that one value may be specified for advertising and/or one value may be specified for closing. In one example, an operational code value of eight may represent a send with an event and advertise operation. In another example, an operational code value of twelve may represent a send with an event and close operation.

FIG. 5B illustrates an embodiment of a send format for STag communications using a DDP protocol according to various aspects of the present invention. In FIG. 5B, an RDMA message may include, for example, an optional STag field and one or more bits (e.g. a "bit flag") in a command field. In one embodiment, two bits (e.g., bits 12 and 13) of a DDP flag field may be employed. The DDP flag field may include, for example, 2 or more bits. If either of the two bits is set, then the optional STag field may be valid and the optional STag field may include, for example, the STag value that represents the SGL (or other indication of memory) passed in the first command request from the driver.

The STag field may be present in all RDMA headers or may be present in only those RDMA headers in which the validating operation codes are set. In one embodiment, the protocol may define whether the STag field is present in each RDMA header or not.

The encoding of the two bits may be such that three states are possible including, for example, no STag, advertise STag and close STag. In one example, bit 12 of the DDP flag field may be set to indicate an advertise STag operation. In another example, bit 13 may be set to indicate a close STag operation.

One or more embodiments of the present invention may include one or more of the advantages as set forth below.

In some embodiments, the present invention may provide for novel command formats being developed between a driver and a NIC to allow one-shot initiation. Since buffer information may be specified with a send message, the NIC may have an opportunity to ensure that the buffer work has been completed before the send command is transmitted. Furthermore, the NIC may insert the STag value (e.g., a handle to SGL information) in a consistent manner. Accordingly, one-touch access for command generation may be provided.

In some embodiments, the present invention may provide for one-shot completion. The NIC may order the buffer freeing operations with the send completion so that resources (e.g., all resources) may be safely recovered without multiple calls by the driver. Accordingly, one-touch activity may be provided between the NIC and the driver.

In some embodiments, the present invention may provide for existing storage protocols such as, for example, iSCSI to be efficiently mapped to RDMA. Buffer information needed for commands, and completions needed by the NIC for acceleration, may be, for example, in the RDMA headers and may be automatically pre-pended to the packets. Accordingly, complete iSCSI protocol packets (or any other storage protocol packets) may be sent as payload to RDMA without modification. This may also provide for sending iSCSI control information embedded in RDMA Send messages, for example, while accelerating data transfer with RDMA commands.

In some embodiments, the present invention may provide for the construction of a NIC that supports RDMA and storage at optimal speeds. Some embodiments may provide for the construction of a NIC that supports RDMA and storage at optimal speeds without having to carry all the cost burden of implementing two different line protocols, two different command protocols or two different buffer management protocols. A small modification to the RDMA protocol may provide for operation at the same performance as customized storage designs. Thus, substantially less expensive design costs may result.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system for transferring data over a remote direct memory access (RDMA) network, comprising:
    a host comprising a driver and a network interface card (NIC), the driver being coupled to the NIC,
    wherein a one-shot initiation process of an RDMA operation is performed between the driver and the NIC of the host, the one-shot initiation process comprising communicating a single command message comprising:
    buffer command information, and
    a write command to write a send command.

2. The system according to claim 1, wherein the driver posts the single command message to perform the one-shot initiation process.

3. The system according to claim 1, wherein the buffer command information comprises a command to describe pinned-down memory buffers of the host.

4. The system according to claim 3, wherein the buffer command information comprises a command to bind a portion of the pinned-down memory buffers of the host to a steering tag (STag).

5. The system according to claim 1, wherein the send command is an RDMA send message.

6. The system according to claim 4, wherein the NIC places the STag value in an optional field in a direct data placement DDP or RDMA header.

7. The system according to claim 6, wherein the NIC encodes a value into a field in the DDP or RDMA header indicating that the STag value in the optional field is valid.

8. The system according to claim 6, wherein the NIC sets one or more bits in a field in the DDP or RDMA header indicating that the STag value in the optional field is valid.

9. The system according to claim 6, wherein the NIC sets one or more bits or encodes a value into a second field in the DDP or RDMA header to advertise the portion of the pinned memory buffers of the host associated with the STag.

10. The system according to claim 1, wherein the buffer command information provides a description of a section of memory.

11. The system according to claim 1, wherein the single command message is posted to a command ring of the host.

12. The system according to claim 11, wherein the driver allocates an STag value.

13. The system according to claim 12, wherein the STag value is returned synchronously from a command call.

14. The system according to claim 12, wherein the STag value is saved in a driver command table of the host.

15. The system according to claim 14, wherein the STag value saved in a driver command table is associated with an application reference number.

16. The system according to claim 1, wherein the NIC comprises an RDMA-enabled NIC.

17. A system for transferring data over a remote direct memory access (RDMA) network, comprising:
    a host comprising a driver and a network interface card (NIC), the driver being coupled to the NIC,
    wherein a one-shot completion process of an RDMA operation is performed between the driver and the NIC of the host, the one-shot completion process comprising communicating a single completion message comprising:
    a send complete indication, and
    buffer freeing status information.

18. The system according to claim 17, wherein the NIC receives a message comprising an optional field carrying a STag value, the STag value being associated with pinned memory in a remote host.

19. The system according to claim 18, wherein a header of the message indicates the validity of the optional field with a bit flag or specified value in an encoded field.

20. The system according to claim 18, wherein the NIC de-associates the STag value with the pinned memory in the host, thereby preventing further access to the pinned memory using the de-associated STag value.

21. The system according to claim 18,
    wherein the single completion message comprises the optional field carrying the STag value received by the NIC;
    wherein the NIC delivers the single completion message to the driver, and
    wherein the driver compares the STag value received with a STag value previously sent.

22. The system according to claim 18, wherein the NIC de-associates the STag value with previously associated SGL information.

23. The system according to claim 20, wherein the NIC frees any resources dedicated to information regarding the pinned memory.

24. A method for transferring data over an RDMA network, comprising:
    initiating an RDMA write operation using a one-shot initiation process between a driver and a NIC of a host, wherein the one-shot initiation process comprises communicating a single command message comprising:
    buffer command information comprising commands to insert and validate an STag value, and
    a write command to write an RDMA send message;
    inserting the STag value in a first field of a DDP or RDMA header of the RDMA send message; and
    validating the STag value in the first field with a bit flag or other specified value in a second field of the DDP or RDMA header.

25. A method for transferring data over an RDMA network, comprising:
    completing an RDMA write operation using a one-shot completion process between a NIC and a driver of a host, wherein the one-shot completion process comprises communicating a single completion message comprising:
    a send complete indication,
    buffer freeing status information, and
    an STag value;
    receiving the single completion message;
    identifying the STag value in a first field of a header of the single completion message; and validating the STag value in the first field of the header by identifying a bit flag or other specified value in a second field of the header.

* * * * *